(12) United States Patent
Cover

(10) Patent No.: US 9,234,587 B2
(45) Date of Patent: Jan. 12, 2016

(54) MULTI-CAPACITY CYLINDER

(75) Inventor: Stuart Cover, Queensland (AU)

(73) Assignee: Caterpillar Global Mining LLC, Oak Creek, WI (US)

( * ) Notice: Subject to any disclaimer, the term of this patent is extended or adjusted under 35 U.S.C. 154(b) by 775 days.

(21) Appl. No.: 13/478,947

(22) Filed: May 23, 2012

(65) Prior Publication Data

US 2013/0312599 A1    Nov. 28, 2013

(51) Int. Cl.
| | |
|---|---|
| *F16J 10/00* | (2006.01) |
| *F16J 1/12* | (2006.01) |
| *F16J 10/02* | (2006.01) |
| *F15B 11/036* | (2006.01) |
| *F15B 15/14* | (2006.01) |
| *B60G 17/056* | (2006.01) |

(52) U.S. Cl.
CPC ............... *F16J 1/12* (2013.01); *B60G 17/056* (2013.01); *F15B 11/036* (2013.01); *F15B 15/1466* (2013.01); *F16J 10/02* (2013.01); *B60G 2202/413* (2013.01)

(58) Field of Classification Search
CPC ............... F15B 11/036; F15B 15/1466; F15B 15/1428; F15B 2215/30; F16J 1/12; F16J 10/02; B60G 2202/413; B60G 17/056
USPC ......... 92/169.1, 109, 152; 91/169, 28, 29, 32, 91/33, 207, 208, 519
See application file for complete search history.

(56) References Cited

U.S. PATENT DOCUMENTS

| | | | |
|---|---|---|---|
| 4,531,451 A * | 7/1985 | Mouton ............................ | 92/108 |
| 4,828,230 A * | 5/1989 | Steger et al. ................ | 267/64.16 |
| 5,634,389 A * | 6/1997 | Horan et al. ..................... | 91/445 |
| 6,073,654 A | 6/2000 | Dettmers et al. | |
| 6,098,653 A | 8/2000 | Kobow et al. | |
| 6,145,307 A * | 11/2000 | Dantlgraber ................... | 60/327 |
| 6,209,440 B1 | 4/2001 | Dannehl et al. | |
| 6,609,539 B2 | 8/2003 | Reinelt et al. | |
| 6,615,705 B2 | 9/2003 | Reinelt et al. | |
| 6,779,776 B2 | 8/2004 | Suilmann et al. | |
| 6,837,269 B2 | 1/2005 | Reinelt et al. | |
| 6,991,407 B2 | 1/2006 | Dannehl et al. | |
| 6,996,979 B1 | 2/2006 | Esch et al. | |
| 7,174,826 B2 | 2/2007 | Kerrigan et al. | |
| 7,320,625 B2 | 1/2008 | Mundry et al. | |
| 7,428,861 B2 | 9/2008 | Dettmers et al. | |
| 2011/0056192 A1 | 3/2011 | Weber et al. | |
| 2011/0135502 A1 | 6/2011 | Esch et al. | |
| 2011/0289911 A1 | 12/2011 | Vonderwell | |
| 2012/0055149 A1 | 3/2012 | Vonderwell | |

FOREIGN PATENT DOCUMENTS

| | | |
|---|---|---|
| WO | WO-2010/134001 | 11/2010 |
| WO | WO-2010/138122 | 12/2010 |
| WO | WO-2010/140996 | 12/2010 |
| WO | WO-2010/141007 | 12/2010 |
| WO | WO-2011/031851 | 3/2011 |

* cited by examiner

*Primary Examiner* — Dwayne J White
*Assistant Examiner* — Logan Kraft

(57) ABSTRACT

A multi-capacity hydraulic cylinder includes a hollow cylinder closed by a cylinder head, an annular piston moveable within the hollow cylinder to divide the interior of hollow cylinder into a first chamber and a second chamber, a hollow piston rod coupled to the piston and aligned with an opening in the piston, and a secondary rod moveable within the hollow piston rod to define a third chamber in the hollow piston rod, where the third chamber has a cross-sectional area that is less than the cross-sectional area of the first chamber.

14 Claims, 9 Drawing Sheets

MULTI-CAPACITY CYLINDER

FIELD

The present disclosure relates generally to the field of fluid cylinders and more specifically an improved fluid cylinder that is capable of multiple output forces and speeds for use with a fluid source providing a single input pressure.

BACKGROUND

Fluid cylinders (e.g. linear hydraulic actuators) generally include a piston moveable within a hollow cylinder The piston is coupled to a piston rod and defines a chamber within the interior of the cylinder. By pumping pressurized hydraulic fluid such as oil into and out of the interior chamber, the piston is moved within the cylinder. The piston rod is therefore moved relative to the cylinder, extending or retracting to do mechanical work. The cylinder typically has a constant cross-sectional area and the volume of oil pumped into the chamber is directly proportional to the force applied to the piston and inversely proportional to the speed of the piston. A cylinder with a relatively large cross-section will therefore actuate more slowly, but with a larger force. A cylinder with a relatively small cross-section will actuate more quickly, but with a smaller force.

Generally, the capacities of conventional fluid cylinders compromise both force and speed. Conventional fluid cylinders are typically sized to produce enough force under a system working pressure to meet high load conditions, but also to produce an acceptable movement speed at maximum system flow. To achieve maximum actuation speed in an unloaded fluid cylinder, the flow rate of the fluid is increased, such as with a variable flow pump or by increasing the speed of an engine driving a fixed flow pump. A fixed flow pump typically has a volume that is proportional to the shaft speed, such that when there is little demand in the system the excess oil is inefficiently bypassed back to a sump or storage tank.

Accordingly, it would be advantageous to provide an improved fluid cylinder that is capable of multiple output forces and speeds for use with a fluid source providing a single input pressure.

SUMMARY

One embodiment of the disclosure relates to a multi-capacity hydraulic cylinder that includes a hollow cylinder closed by a cylinder head, an annular piston moveable within the hollow cylinder to divide the interior of hollow cylinder into a first chamber and a second chamber, a hollow piston rod coupled to the piston and aligned with an opening in the piston, and a secondary rod moveable within the hollow piston rod to define a third chamber in the hollow piston rod, where the third chamber has a cross-sectional area that is less than the cross-sectional area of the first chamber.

Another embodiment of the disclosure relates to a hydraulic system having a multi-capacity cylinder, a fluid reservoir, a hydraulic pump, and a hydraulic circuit coupling the multi-capacity cylinder to the fluid reservoir and the hydraulic pump. The multi-capacity cylinder includes a hollow cylinder closed by a cylinder head, an annular piston moveable within the hollow cylinder to divide the interior of hollow cylinder into a first chamber and a second chamber, a hollow piston rod coupled to the piston and aligned with an opening in the piston, and a secondary rod moveable within the hollow piston rod to define a third chamber in the hollow piston rod.

A further embodiment of the disclosure relates to a hydraulic system that includes a multi-capacity cylinder, a throttle passage, an accumulator, and a hydraulic circuit coupling the multi-capacity cylinder to the accumulator. The multi-capacity cylinder includes a hollow cylinder closed by a cylinder head, an annular piston moveable within the hollow cylinder to divide the interior of hollow cylinder into a first chamber and a second chamber, a hollow piston rod coupled to the piston and aligned with an opening in the piston, a secondary rod moveable within the hollow piston rod to define a third chamber in the hollow piston rod.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
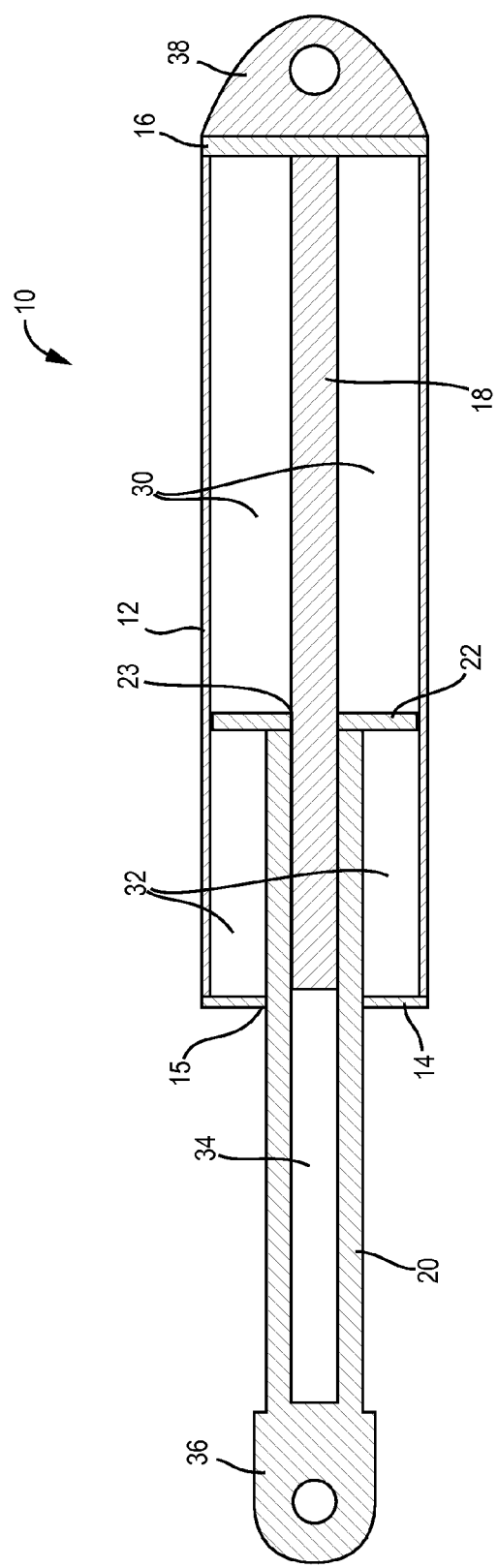
FIG. 1 is a schematic diagram of a multi-capacity cylinder, in accordance with an exemplary embodiment.

Referring to FIG. 1 a linear actuator is shown according to an exemplary embodiment as a multi-capacity cylinder (MCC) 10. The MCC 10 has multiple interior chambers that can be pressurized in different combinations, allowing the actuator to operate as a variable force and variable speed actuator. When the load is small, the cylinder can move quickly with little force; as the load increases, the cylinder changes capacitys to increase capacity and decrease speed. The MCC 10 may be hydraulic or pneumatic, double acting or single acting.

As shown in FIG. 1, in one embodiment the MCC 10 includes a hollow barrel or cylinder 12 closed by a cylinder base 14 and a cylinder head 16. A piston rod 20 is coupled to a piston 22, which is reciprocally moveable in the cylinder 12 and separates the interior of the cylinder 12 into a primary chamber 30 and a return chamber 32. The piston rod 20 extends through a hermetically sealed opening 15 in the cylinder base 14. According to an exemplary embodiment, the piston rod 20 is a hollow member forming a secondary chamber 34. A secondary rod 18 is fixed to the cylinder head 16 and is coaxial with the cylinder 12, the piston rod 20, and the piston rod 20. The secondary rod 18 is received in the secondary chamber 34 through a hermetically sealed opening 23 in the piston 22. The secondary rod 18 may be integrally formed with the cylinder head 16 or may be coupled to the cylinder head 16 with a suitable coupling method, such as welding. Because the secondary rod 18 is fixed to the cylinder head 16, the secondary rod 18 moves with the cylinder 12. Further, pressure applied to either the piston 22 or the end of the secondary rod 18 is translated to movement of the cylinder 12.

Figure 8:
FIG. 8 is a schematic view of a multi-capacity linear actuator on the boom lift of a large shovel, in accordance with an exemplary embodiment.
Figures 9A, 9B:
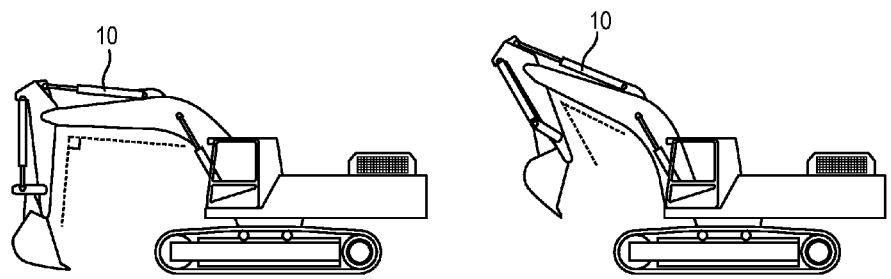
FIGS. 9A-9C are schematic diagrams of a multi-capacity cylinder for use with an excavator in various positions, according to an exemplary embodiment.
Figure 9C:
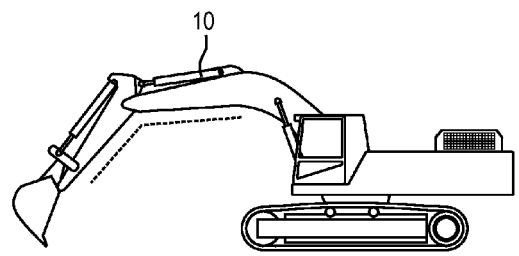

The MCC 10 may be coupled at either end to a mechanical linkage and may be utilized to move the linkage (such as shown by way of example in FIGS. 8-9C). In one embodiment, the MCC includes a first mounting lug 36 coupled to the piston rod 20 and a second mounting lug 38 coupled to the cylinder head 16.

The primary chamber 30, the return chamber 32, and the secondary chamber 34 are in fluid communication with each other and a fluid reservoir through a hydraulic circuit. The triple acting MCC 10 is generally analogous to a paired large bore actuator and small bore actuator. The large actuator formed by the piston 22 and the cylinder 12 is configured to support high loads at lower speeds. The smaller actuator formed by the secondary rod 18 and the hollow piston rod 20 cylinder is configured to support lower loads at higher speeds.

Figure 2:
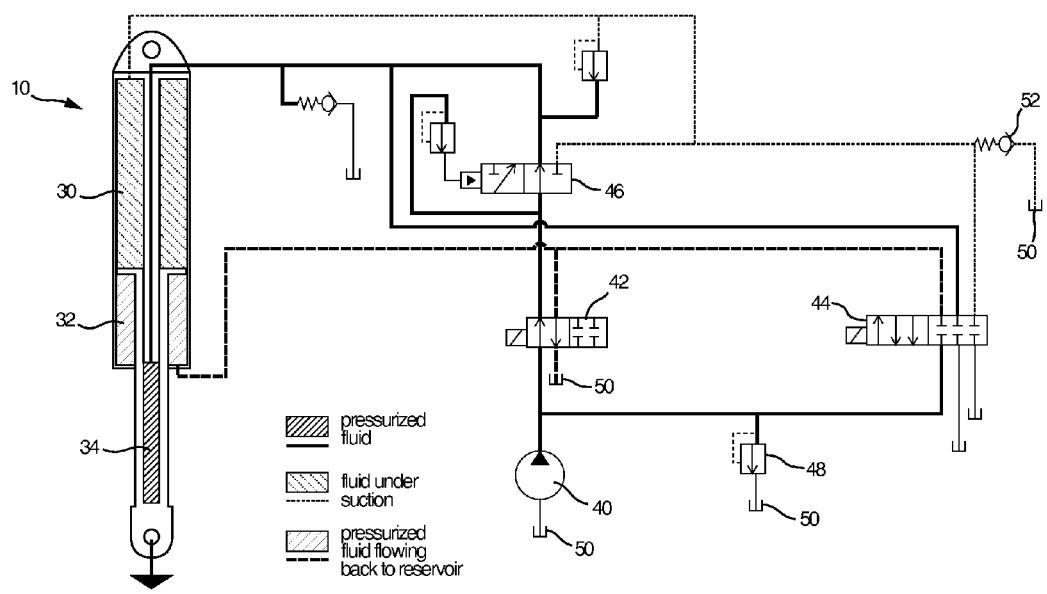
FIG. 2 is a schematic diagram of a hydraulic circuit with a three-capacity linear actuator in a neutral mode, in accordance with an exemplary embodiment.

Referring now to FIG. 2, the MCC 10 extends when unloaded by pressurizing the smaller secondary chamber 34. A first valve 42 is opened and a second valve 44 is closed such that pressurized fluid is forced into the secondary chamber 34 with a hydraulic fluid with a pump 40 through a pressure sensor valve 46 in a first position (e.g., low pressure position, unloaded position, etc.). As the fluid fills the secondary chamber 34 and the MCC 10 extends, fluid is drawn into the larger primary chamber 30 from the reservoir 50 through a check valve 52. At the same time, fluid is forced out of the return chamber 32 and passes through the first valve 42 to the reservoir 50. The secondary chamber 34 has low displacement and quick movement (similar to the return chamber 32). By utilizing the secondary chamber 34 to extend the MCC 10 when unloaded, a reduced volume of fluid is used and the speed and efficiency of the mechanism actuated by the MCC 10 is increased.

Figure 3:
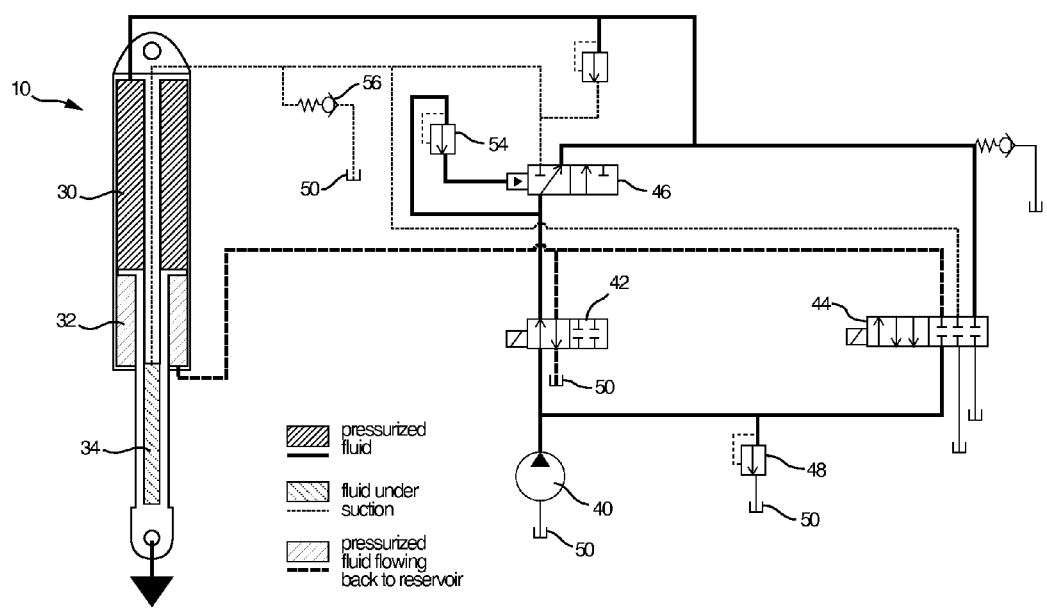
FIG. 3 is a schematic diagram of the hydraulic circuit of FIG. 2 with a three-capacity linear actuator in a moderate load mode, in accordance with an exemplary embodiment.

Referring now to FIG. 3, the MCC 10 extends under moderate loads by pressurizing the larger primary chamber 30. The first valve 42 remains opened and the second valve 44 remains closed. As the MCC 10 begins to encounter a greater load compared to the unloaded state of FIG. 2, the pressure builds in the hydraulic circuit until the pressurized fluid passes through a pressure relief valve 54 to actuate the pressure sensor valve 46 to a second position (e.g., high pressure position, loaded position, etc.). In the second position, the pressure sensor valve 46 diverts the fluid to the primary chamber 30. As the fluid fills the primary chamber 30 and the MCC 10 extends, fluid is drawn into the smaller secondary chamber 34 from the reservoir 50 through a check valve 56. At the same time, fluid is forced out of the return chamber 32 and passes through the first valve 42 to the reservoir 50. The primary chamber 30 has a large amount of force and a moderate amount of movement. In this mode, the MCC 10 operates much like a conventional cylinder.

Figure 4:
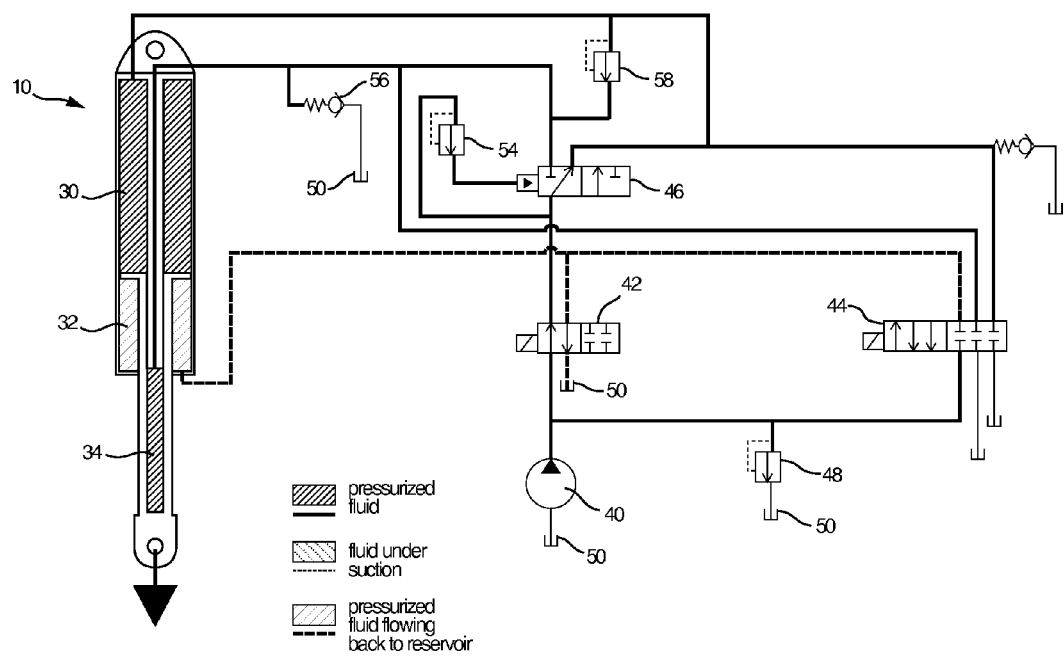
FIG. 4 is a schematic diagram of the hydraulic circuit of FIG. 2 with a three-capacity linear actuator in a peak load mode, in accordance with an exemplary embodiment.

Referring now to FIG. 4, the MCC 10 extends under elevated loads by pressurizing both the larger primary chamber 30 and the smaller secondary chamber 34. The first valve 42 remains opened, the second valve 44 remains closed, and the pressure sensor valve 46 remains in the second position. As MCC 10 encounters even greater loads, (e.g. when a bucket actuated by the MCC 10 is digging against a pile and is lifting more weight than a "loaded bucket" the pressurized fluid passes through a pressure relief valve 58 to pressurize both the primary chamber 30 and the secondary chamber 34). This allows the capacity of the MCC 10 to increase above the capacity of the moderate load or "conventional" mode shown in FIG. 3, resulting in extra force when needed without putting extra pressure on the system. The peak load capability of the MCC 10 may reduce the tendency for the operator of a device utilizing the MCC 10 to impulse-load the device to produce more force than the hydraulic system is designed for (e.g., when digging with the bucket of a hydraulic shovel). If the MCC 10 becomes overloaded in this mode, hydraulic fluid may be diverted to the reservoir 50 through a pressure relief valve 48 to the reservoir 50.

Figure 5:
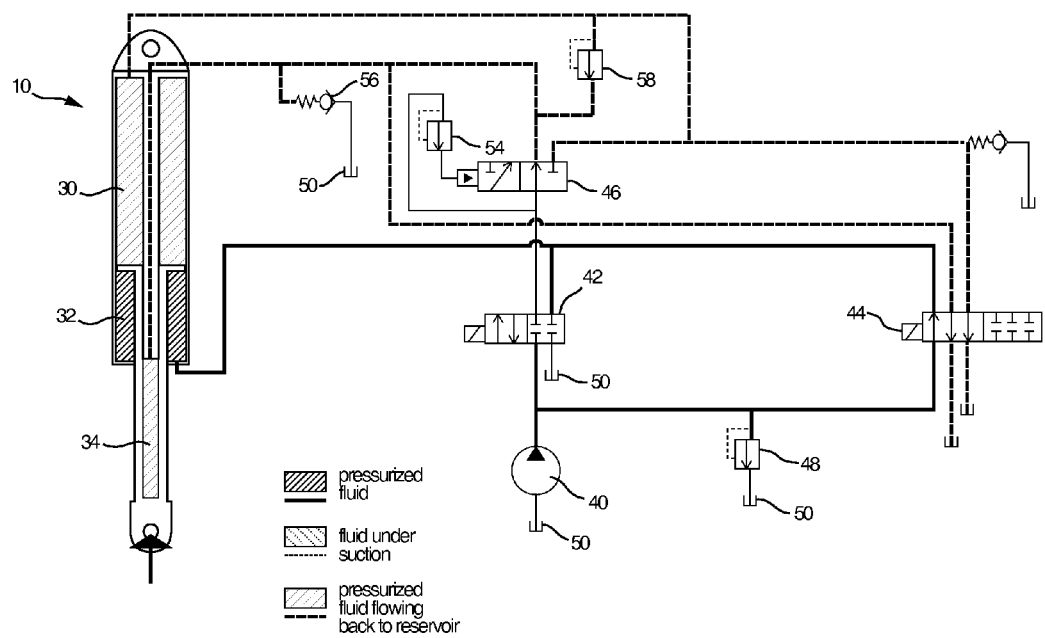
FIG. 5 is a schematic diagram of the hydraulic circuit of FIG. 2 with a three-capacity linear actuator in a retraction mode, in accordance with an exemplary embodiment.

Referring to FIG. 5, the MCC 10 may be retracted by pressurizing the return chamber 32. The first valve 42 is closed and the second valve 44 is opened such that pressurized fluid is forced into the return chamber 32 by the pump 40 through the second valve 44. As the MCC 10 retracts, fluid is forced out of the primary chamber 30 and the secondary chamber 34 and passes through the second valve 44 to the reservoir 50. The return chamber 32 has low displacement and quick movement.

Figure 6:
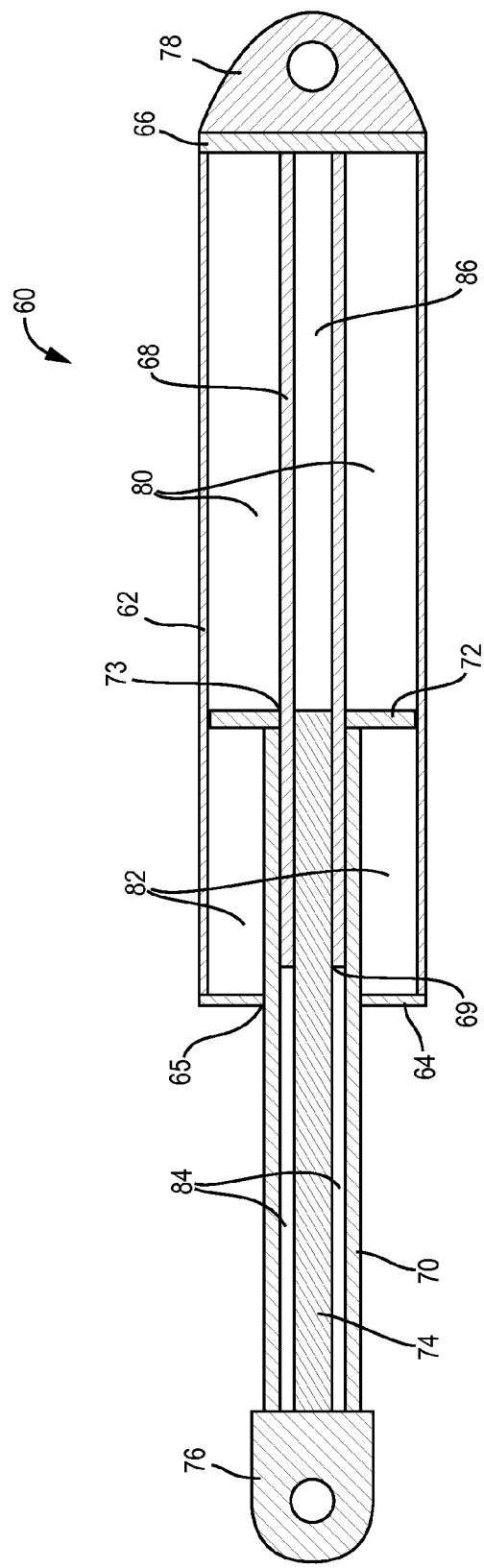
FIG. 6 is a schematic diagram of a multi-capacity cylinder, in accordance with another exemplary embodiment.

Referring now to FIG. 6, an MCC 60 is shown according to another exemplary embodiment. Similar to the MCC 10 described above, the MCC 60 includes a hollow barrel or cylinder 62 closed by a cylinder base 64 and a cylinder head 66. A piston rod 70 is coupled to a piston 72, which is moveable in the cylinder 62 and separates the interior of the cylinder 62 into a primary chamber 80 and a return chamber 82. The piston rod 70 extends through a hermetically sealed opening 65 in the cylinder base 64. The piston rod 70 is a hollow member forming a secondary chamber 84. A secondary rod 68 is fixed to the cylinder head 66 and coaxial with the cylinder 62, the piston rod 70, and the piston 72. The secondary rod 68 is received in the secondary chamber 84 through a hermetically sealed opening 73 in the piston 72. The secondary rod 68 may be integrally formed with the cylinder head 66 or may be coupled to the cylinder head with a suitable coupling method, such as welding. Further, according to an exemplary embodiment, the secondary rod 68 is also a hollow member forming a tertiary chamber 86. A tertiary rod 74 is fixed to the base of the piston rod 70 and coaxial with the cylinder 62, the piston rod 70, the piston 72, and the secondary rod 68. The tertiary rod 74 is received in the tertiary chamber 86 through the hermetically sealed open end 69 of the secondary rod 68. The tertiary rod 74 may be integrally formed with the piston rod or may be coupled to the piston rod with a suitable coupling method, such as welding.

The MCC 60 may be coupled at either end to a mechanical linkage and may be utilized to move the linkage. In one embodiment, the MCC includes a first mounting lug 76 coupled to the piston rod 70 and a second mounting lug 78 coupled to the cylinder head 66.

The primary chamber 80, the return chamber 82, the secondary chamber 84, and the tertiary chamber 86 are in fluid communication with each other and a fluid reservoir through a hydraulic circuit. The seven-capacity MCC 60 is analogous to a grouping of three actuators of various bore sizes. A first actuator is formed by the piston 72 and the cylinder 62 is configured as a large bore actuator to support high loads at lower speeds. The second and third actuators are formed by the secondary rod 68 and the hollow piston rod 70 cylinder and by the tertiary rod 74 and the hollow secondary rod 68 cylinder, respectively. The second and third actuators are configured as smaller bore actuators to support lower loads at higher speeds. The properties of the second and third actuators are determined by the cross-sectional areas of the annular secondary chamber 84 and the tertiary chamber 86, which in turn depend on the diameters of the tertiary rod 74, the secondary rod 68, and the piston rod 70. While the MCC 60 is shown as having three actuating chambers 80, 84, and 86, along with a return chamber 82, it should be understood that in other embodiments, the MCC 60 may include more coaxial elements fixed to the cylinder head 66 or the base of the piston rod 70.

Figure 7A:
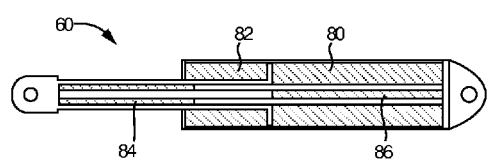
FIGS. 7A-7H are schematic diagrams of the actuator of FIG. 6 in various capacities, in accordance with an exemplary embodiment.
Figure 7B:
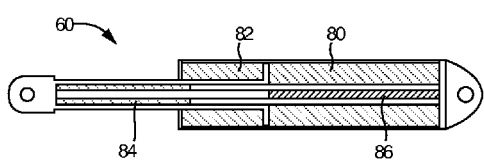
Figure 7C:
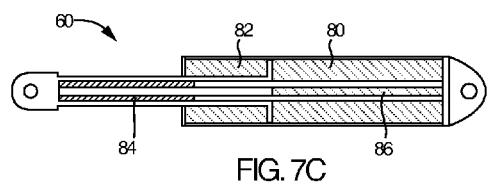
Figure 7D:
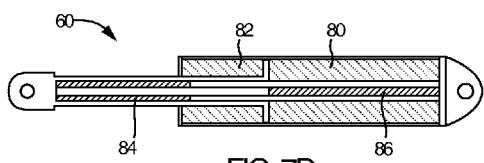
Figure 7E:
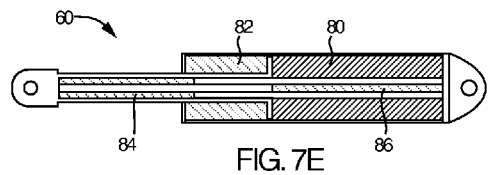
Figure 7F:
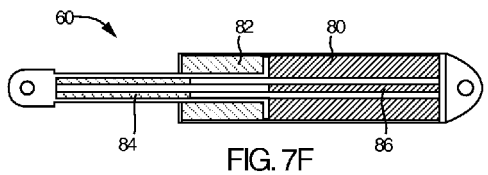
Figure 7G:
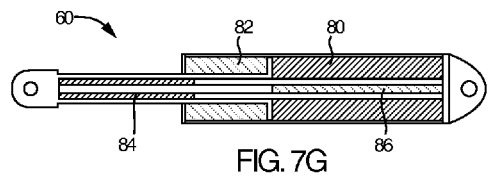
Figure 7H:
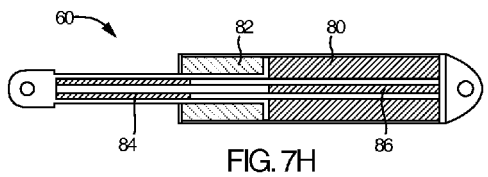

Referring now to FIGS. 7A-7H, the MCC 60 is capable of being utilized in a wide variety of applications and can actuate at a range of speeds and support a range of loads. In an unloaded state (FIG. 7A), the MCC 60 is in equilibrium and the primary chamber 80, the return chamber 82, the secondary chamber 84, and the tertiary chamber 86 are all unpressurized. The MCC 60 as shown in FIGS. 7A-7H has a primary chamber 80 with a cross-sectional area greater than that of the secondary chamber 84 and a tertiary chamber 86 with a cross-sectional area less than that of the primary chamber 80 and the secondary chamber 84. In addition, the combined cross-sectional areas of the secondary chamber 84 and the tertiary chamber 86 are less than that of the primary chamber 80. In order from lowest force and highest speed to highest force and lowest speed, the MCC 60 may be actuated in a mode or capacity with only the tertiary chamber 86 (FIG. 7B); only the secondary chamber 84 (FIG. 7C); the secondary chamber 84 and the tertiary chamber 86 (FIG. 7D); only the primary chamber 80 (FIG. 7E); the primary chamber 80 and the tertiary chamber 86 (FIG. 7F); the primary chamber 80 and the secondary chamber 84 (FIG. 7G); or the primary chamber 80, the secondary chamber 84, and the tertiary chamber 86 (FIG. 7H).

An MCC 10 or 60 as shown in FIG. 1 or 6 may advantageously replace a conventional hydraulic cylinder in a variety of applications where the loads tend to fluctuate. According to any exemplary embodiment, an MCC 10 or MCC 60 provides the capability to deliver varying forces and velocities for extension and retraction of the multi-capacity cylinder, with automatic switchover among the chambers being pressurized, according to the amount of force and the rate of application of the force being applied, using an oil pump with substantially constant pressure and flow.

Referring to FIG. 8, in one embodiment, an MCC 10 (or MCC 60) may be utilized on the boom lift of a mining shovel. In such an application, the MCC 10 is coupled to a hydraulic circuit that includes a hydraulic pump, as shown in FIGS. 2-5. In other embodiments, all of the conventional cylinders on a typical mining shovel boom may be replaced with MCCs 10. The MCC 10 is able to compensate for variable loads and may advantageously increase unloaded speed (decreasing cycle time), and may increase loaded force or machine capacity. These advantages may be achieved without conventionally increasing the power/engine speed (and hence the fuel consumption).

Referring to FIGS. 9A-9C, an MCC 10 (or MCC 60) may be utilized on an excavator. The MCC 10 may decrease cycle time by increasing the 'unloaded' speed of the cylinder. Further, the MCC 10 allows the excavator or other device to deliver a more constant force regardless of the changing mechanical advantage of the linkage actuated by the MCC 10 (e.g., the boom, stick, and bucket of an excavator). As shown in FIG. 9A, when the link actuated by the MCC 10 (e.g., the stick) is at a right angle the mechanical advantage is at the greatest and a lower capacity chamber may be utilized to extend or retract the MCC 10. As shown in FIG. 9B, when the link is at an acute angle, the mechanical advantage is reduced and a larger capacity chamber may be utilized. Likewise, as shown in FIG. 9C, when the link is at an obtuse angle, the mechanical advantage is also reduced and a larger capacity chamber may again be utilized.

Figure 10:
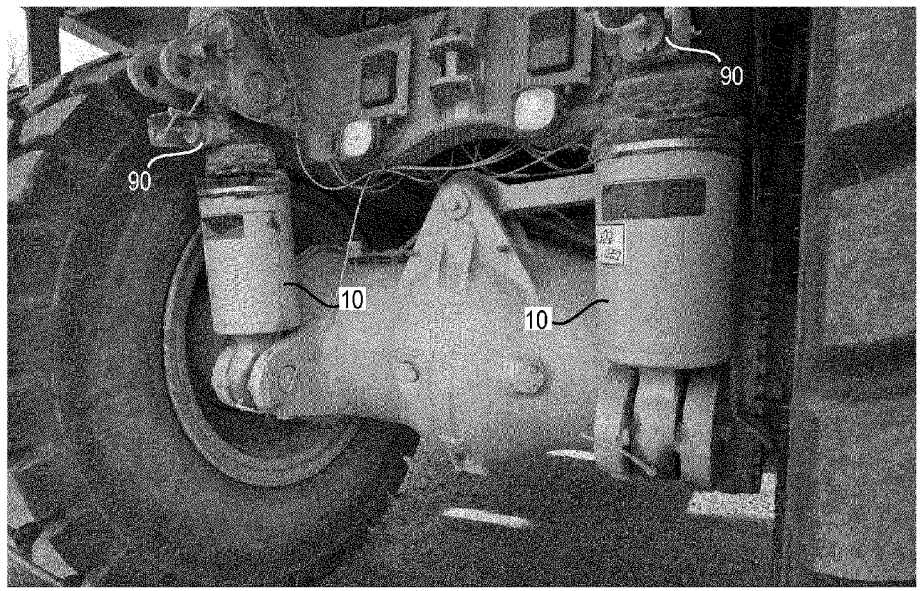
FIG. 10 is a schematic view of a multi-capacity linear actuator on the suspension of a large truck, in accordance with an exemplary embodiment.

Referring to FIG. 10, in another embodiment, an MCC 10 (or MCC 60) may be utilized in the suspension system of a truck, such as a mining truck. In such an application, the MCC 10 is coupled to a hydraulic circuit that includes an accumulator 90. When the suspension system is compressed, hydraulic fluid is forced from the cylinder by the 12 by the piston 22 through an outlet (e.g., throttle passage) to an accumulator 90. Friction from movement of the hydraulic fluid through the cylinder outlet and associated plumbing dissipates energy associated with actuation of the suspension system in a manner proportional to the velocity of the actuation.

When unloaded, only the chamber with the smallest area (e.g., the secondary chamber 34 or the tertiary chamber 86) is open to the accumulator 90. As the load increases or when a sudden obstruction such as a bump is hit, the capacity of the MCC 10 increases by including other chambers in various combinations. The preferred pressure is therefore maintained for a relatively soft ride while still accommodating sudden increases in the load. The suspension of a truck using an MCC 10 is not unnecessarily hard when the truck is empty or susceptible to bottoming out when the truck is full or hitting a bump.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The construction and arrangements of the multi-capacity cylinder, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A multi-capacity hydraulic system, comprising
a hollow cylinder closed by a cylinder head;
an annular piston moveable within the hollow cylinder, the piston dividing the interior of hollow cylinder into a first chamber and a second chamber;
a hollow piston rod coupled to the piston, the piston rod aligned with an opening in the piston; and
a secondary rod moveable within the hollow piston rod, the secondary rod defining a third chamber in the hollow piston rod;
wherein the multi-capacity hydraulic cylinder is coupled to a fluid reservoir with a hydraulic circuit comprising a pressure sensitive switch, the switch movable between a first position directing a hydraulic fluid to the third chamber and second position directing fluid to the first chamber; and
wherein the third chamber has a cross-sectional area that is less than the cross-sectional area of the first chamber.

2. The multi-capacity hydraulic system of claim 1, further comprising a first mounting lug coupled to the piston rod and a second mounting lug coupled to the cylinder head.

3. The multi-capacity hydraulic system of claim 2, wherein the multi-capacity cylinder may be extended by pressurizing one of the first chamber, the third chamber, or a combination of the first chamber and the third chamber.

4. The multi-capacity hydraulic system of claim 3, wherein the multi-capacity cylinder extends at a first rate when the first chamber is pressurized and a second rate when the third chamber is pressurized, the first rate being less than the second rate.

5. The multi-capacity hydraulic system of claim 3, wherein the multi-capacity cylinder extends with a first force when the first chamber is pressurized and with a second force when the third chamber is pressurized, the first force being greater than the second force.

6. The multi-capacity hydraulic system of claim 5, wherein the multi-capacity cylinder extends with a third force when the first chamber and the third chamber are pressurized, the third force being greater than the first force and the second force.

7. The multi-capacity hydraulic system of claim 2, further comprising a coaxial tertiary rod coupled to the piston rod, wherein the secondary rod is a hollow member and tertiary rod is moveable within the secondary rod.

8. The multi-capacity hydraulic system of claim 7, wherein the tertiary rod defines a fourth chamber in the secondary rod, the fourth chamber having a cross-sectional area less than the cross-sectional area of the second chamber.

9. The multi-capacity hydraulic system of claim 8, wherein the multi-capacity cylinder may be extended by pressurizing one of the first chamber; the third chamber; the fourth chamber; the first chamber and the third chamber; the first chamber and the fourth chamber; the third chamber and the fourth chamber; or the first chamber, the third chamber, and the fourth chamber.

10. A hydraulic system, comprising:
a multi-capacity cylinder comprising:
a hollow cylinder closed by a cylinder head;
an annular piston moveable within the hollow cylinder, the piston dividing the interior of hollow cylinder into a first chamber and a second chamber;
a hollow piston rod coupled to the piston, the piston rod aligned with an opening in the piston; and
a secondary rod moveable within the hollow piston rod, the secondary rod defining a third chamber in the hollow piston rod;
a fluid reservoir;
a hydraulic pump; and
a hydraulic circuit coupling the multi-capacity cylinder to the fluid reservoir and the hydraulic pump; and wherein the hydraulic circuit comprises a pressure sensitive switch, the switch movable between a first position directing the fluid to the third chamber and second position directing fluid to the first chamber.

11. The hydraulic system of claim 10, wherein the hydraulic circuit directs fluid to the third chamber below a first threshold pressure in the hydraulic circuit; the hydraulic circuit directs fluid to the first chamber above the first threshold pressure and below a second threshold pressure in the hydraulic circuit; and the hydraulic circuit directs fluid to both the first chamber and the third chamber above the second threshold pressure in the hydraulic circuit.

12. The hydraulic system of claim 10, wherein the pressure sensitive switch is actuated by fluid passing through a first pressure release valve above the first threshold pressure.

13. The hydraulic system of claim 10, wherein fluid passes through a second pressure release valve above the second threshold pressure to direct fluid to both the first chamber and the third chamber.

14. The hydraulic system of claim 10, wherein the hydraulic system comprises an actuator for the boom of one of a mining shovel or an excavator.

* * * * *